June 3, 1952  B. H. FORD ET AL  2,599,443
CLOSURE MEANS FOR GRAIN CAR DOORWAYS
Filed Sept. 24, 1949  2 SHEETS—SHEET 2

Inventors
Barton H. Ford
Edwin J. Ford
By Michael J. Ford
Arthur H. Sturges
Attorney Patented June 3, 1952

2,599,443

UNITED STATES PATENT OFFICE 2,599,443

CLOSURE MEANS FOR GRAIN CAR DOORWAYS

Barton H. Ford, Edwin J. Ford, and Michael J. Ford, Omaha, Nebr.

Application September 24, 1949, Serial No. 117,602

6 Claims. (Cl. 160—368)

This invention relates to railroad grain car doors and more particularly it is an object of the invention to provide a grain door of improved construction.

An important object of the invention is to provide a grain door which is composed of a plurality of sections whereby the door can be fixed in place by one man rather than two as heretofore necessary.

Another object of the invention resides in the provision of a door of great strength in comparison with doors now in use.

A further object of the invention resides in the provision of a door which is waterproof.

Still another object of the invention resides in the provision of a door which can be placed in position with a minimum of motion.

Yet a further object of the invention is to provide a grain car door employing horizontal bands having fibre board or the like stapled thereto.

A further object of the invention resides in the use of staples to secure sheet material to relatively strong elongated bands in a grain door construction.

Yet another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

In the drawings:

Figure 1 is a frontal elevation of the grain door of this invention shown as applied to the inside of a door opening of a box car, portions of the floor and of the side wall of the box car being shown and remaining portions of the box car being broken away. The upper right hand corner of the fibre board of this invention is broken away for revealing the method of securing the supporting bands of the grain door to the sides of the box car door.

Figure 1:
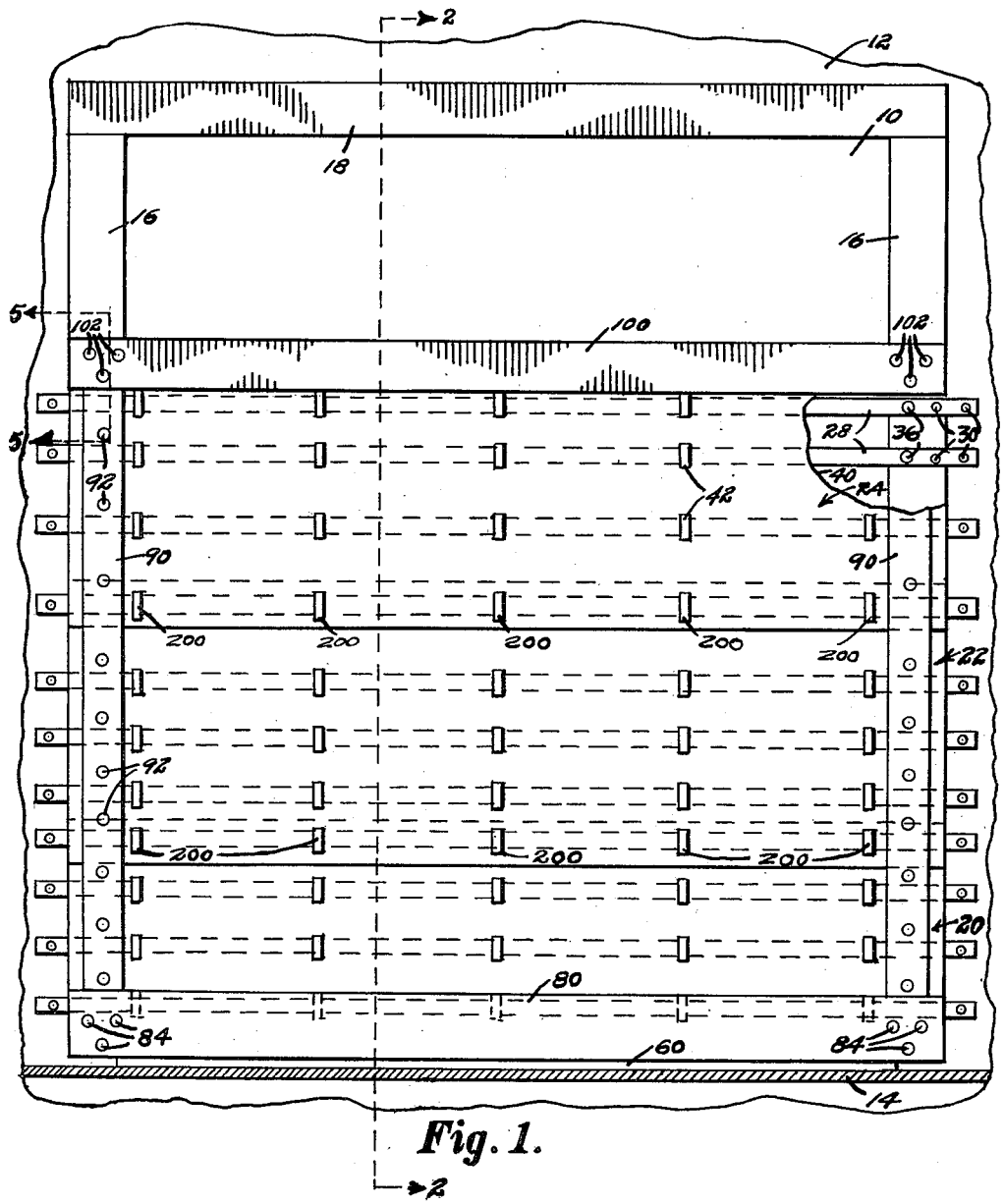

The grain door of this invention is for attachment to the inside edges of the opening 10 in the side wall 12 of a railroad box car. The box car is provided with a floor 14 and the opening 10 is surrounded by two spaced apart vertical frame members 16 and a horizontal upper frame member 18.

The area-covering portions of the door of this invention are in three sections generally indicated at 20, 22, and 24. Each section includes a plurality of vertically spaced apart parallel bands or bars 28 formed of steel or other suitable material having adequate strength. The bands 28 are preferably provided each with a plurality of apertures 30 in each end thereof through which latter nails 36 are adapted to be placed in use.

The nails 36 are preferably of a type having an elongated shank and two spaced apart heads whereby the outer head is used as a pointing surface whereas the inner head is adapted to engage the material being nailed so that the outer head is maintained in a position for easy grasping by a claw hammer or crowbar. With such nails the door is more easily removed.

Figure 3:
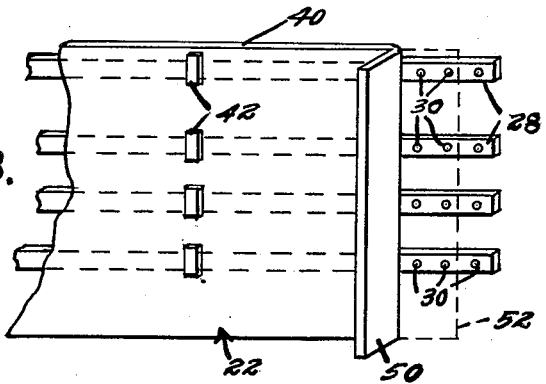
Figure 3 is a perspective view of a broken away right hand end portion of an upper section of the grain door of this invention shown with the right hand edge of the fibre board bent back for revealing nailing portions in bands therebeneath, a final position of the bent back portion being shown in dotted lines.
Figure 4:
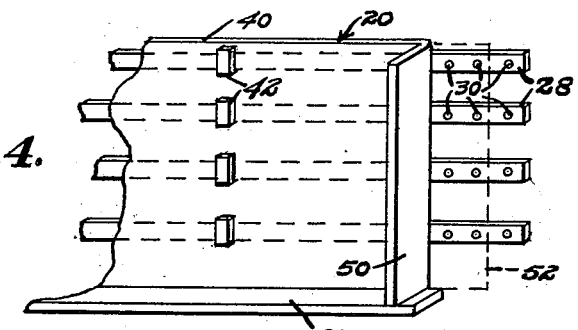
Figure 4 is a perspective view of the lower section of the grain door of this invention, a left hand portion of the lower section being broken away, a right hand end flap portion of the fibre board of the door being shown in a bent back position for revealing nailing points. The final position of the said flap is shown in dotted lines.
Figure 5:
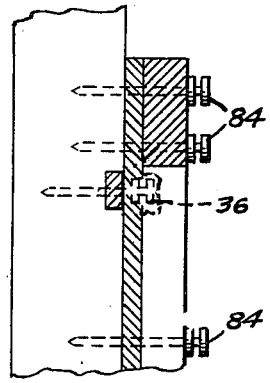
Figure 5 is a view-in-section taken along the line 5—5 of Figure 1.

The upper closure sections of the door are illustrated in Figure 3 and the lower section is indicated in Figure 4. As best seen in Figure 3, the bands 28 are covered by any suitable area-covering material or covering sheet 40, such as fibre board or the like. The material 40 is disposed in an oblong rectangular sheet substantially covering the bands 28. The material 40 is preferably covered with paraffin in a manner substantially waterproof.

The sheet 40 is secured to the bands 28 by means of staples 42 which are disposed with their two ends extending through the fibre board 40 in two spaced apart positions and each with its free end secured about the opposite sides of one of the bands. The staples 42 are preferably disposed in vertical rows. The staples 42 are also disposed in horizontal rows. They are aligned in preferably equidistantly spaced apart positions along the bands 28.

The upper closure sections 22 are each provided with oblong rectangular shaped end portions or flaps 50 which latter are adapted to be bent inwardly during installation at right angles to the remainder of the section for exposing the nail holes 30. The fibre board 40 can be scored vertically on one side providing fold lines to permit the bending of the flaps 50 if necessary. When the door is in final position, as later described, each of the flaps 50 assumes the dotted line position indicated at 52 in Figure 3.

The lower closure section 20 shown in Figure 4 is similar in all respects to the section 22 of Figure 3 with the exception that the fibre board 40 of the section 20 is bent inwardly along its bottom edge to form a flap or flange 60 of oblong rectangular shape, which latter is adapted to be disposed in use along the bottom of the opening 10 against the floor 14 of a box car. The fibre board 40 can be scored, if necessary, for permitting the bending of the portion 60 at a right angle to the remainder thereof.

The portion 20 is also provided with a portion which will be numbered 50 and which is similar in all respects to the portion 50 of the upper sections. The portion 50 of the lower section 20 is adapted to be folded in use into the dotted line position shown at 52 in Figure 4.

In application, the section 20 is first placed across the door opening as shown in Figure 1. The bands 28 of the section 20 are nailed to the side frame members 16 of the opening 10. A single nail 36 for each end of each band is sufficient, although more can be used if desired.

The nail holes 30 in the end of each band 28 are spaced apart longitudinally of the band for each of these so that different nail holes can be used for narrower door openings 10 than for wider door openings 10.

During nailing the flap 50 is disposed as shown in full lines in Figure 4. Following nailing, the flaps 50 are placed in the position indicated in dotted lines in Figure 4.

The center section 22 is then placed in the position shown in Figure 1 with its lower edge overlapping the upper edge of the section 20. The section 22 is similarly nailed in place through the bands 28 thereof and its flaps 50 are placed in the dotted line position 52.

The uppermost section 24 is similarly placed in horizontal position across the door opening with its bottom edge overlapping the upper edge of the section 22. The upper section is then nailed in place at its bands 28 in similar fashion and its flaps 50 are placed in the positions indicated in dotted lines at 52 in Figure 3.

Figure 2:
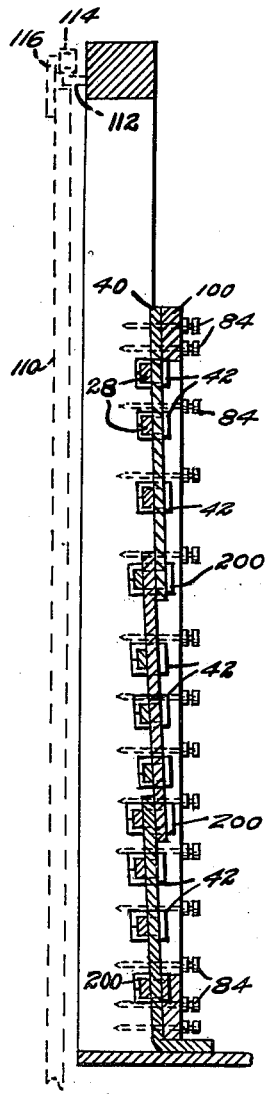
Figure 2 is a view-in-section taken along the line 2—2 of Figure 1, a box car door being partially shown in dotted lines.

The overlapping edges of the sections 20, 22, and 24 are not necessarily fastened together but can be secured together by staples 200 similar to the staples 42, if desired. The staples 200 can be of larger size than the staples 42, if necessary, to pass through two thicknesses of the covering sheet material and also extend around the bands 28, as best seen in Figure 2.

A transverse bottom securing member 80 of comparatively stiff material is now placed in a horizontal position pressing tightly downwardly against the portion 60. Its ends are nailed in place to the frame members 16 by nails 84 similar in all respects to the nails 36.

Two vertically disposed side-securing members 90 are now placed in spaced apart positions extending upwardly from the member 80 in front of each frame member 16. The members 90 extend from the top of the member 80 to the top of the uppermost section 22. The vertical securing members 90 are nailed in place to the frame members 16 through the fibre board 40 by further nails 92 in the bands 28 similar to the nails 36.

An upper horizontal securing member 100 is provided and is disposed with its lower edge overlapping on the inside of the upper edge of the uppermost section 24. The member 100 extends from one side of the opening 10 to the other and is secured in place by nails 102 where the member 100 overlaps the side frame members 16. The nails 102 are similar to the nails 36.

It will be seen that the door of this invention does not in any way interfere with the operation of the railroad box car door 110 which latter is partially shown in dotted lines in Figure 2 traveling along a track 112 on a roller 114 secured by a bracket 116.

This invention has provided a grain door which can be placed in position by one operator, is durable and waterproof, is easily removed, and is of simple and inexpensive construction.

From the foregoing description it is thought to be obvious that a closure means for grain car doorway constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as claimed.

We claim:

1. In a grain door for a railway car having a floor with at least one side wall having a door opening therein and having vertically disposed frame members on the sides of said door opening, a lower closure section comprising spaced parallel horizontally positioned bars having spaced nail holes in the ends adapted to be positioned against the inner surfaces of the said vertically disposed frame members, and a covering sheet having outwardly extended flaps extended from fold lines spaced from the ends and lower edge carried by said bars and positioned with the ends of the bars extended beyond the fold lines between said covering sheet and flaps, said flaps at the ends of the covering sheet positioned against the ends of the bars with the parts in operative position to form a closure, said flap on the lower edge of the covering sheet positioned to engage the floor of the car, and an upper closure section comprising spaced parallel horizontally disposed bars having spaced nail holes in the ends also adapted to be positioned against the inner surfaces of the said vertically disposed frame members, and a covering sheet having outwardly extended flaps extended from fold lines spaced from the ends carried by the bars of the said upper section and also positioned with the ends of the bars extended beyond the fold lines between the covering sheet and said flaps, and said flaps positioned against the ends of the bars with the parts in the operative position, the lower edge of the said covering sheet of the upper section overlapping the upper edge of the covering sheet of the said lower section with the sections assembled to provide a closure for the said door opening.

2. In a grain door for a railway car having a floor with at least one side wall having a door opening therein and having vertically disposed frame members on the sides of said door opening, a lower closure section comprising spaced parallel horizontally positioned bars having spaced nail holes in the ends adapted to be positioned against the inner surfaces of the said vertically disposed frame members, and a covering sheet having outwardly extended flaps extended from fold lines spaced from the ends and lower edge carried by the said bars and positioned with the ends of the bars extended beyond the fold lines between the said covering sheet and flaps, said flaps at the ends of the covering sheet positioned against the ends of the bars with the parts in the operative position, said flap on the lower edge of the covering sheet positioned to engage the floor of the car, an upper closure section comprising spaced parallel horizontally disposed bars having spaced nail holes in the ends also adapted to be positioned against the inner surfaces of the said frame members, and a covering sheet having outwardly extended flaps extended from fold lines spaced from the ends carried by the bars of the said upper section and also positioned with the ends of the bars extended beyond the fold lines between the covering sheet and flaps, and said flaps positioned against the ends of the bars with the parts in the operative position, the lower edge of the covering sheet of the said upper section being extended over the upper edge of the covering sheet of the lower section with the sections assembled to provide a closure for the said door opening, and a rectangular-shaped frame having bottom, top and side members positioned against the said upper and lower sections and secured to the said vertically disposed frame members.

3. In a grain closure for a box car door opening, the combination which comprises an elongated rectangular-shaped sheet having flaps extended from fold lines spaced from the ends and also having a continuous floor engaging flange extended from a fold line spaced from the lower edge, and vertically spaced horizontally positioned bands mounted on one side of said sheet and positioned with the ends of the bands extended beyond the fold lines between the ends of the sheet and flaps, said extended ends of the bands having spaced openings therein.

4. A grain closure as described in claim 3, wherein the bands are attached to the sheet with staples extended through the sheet and crimped over the bands.

5. In combination with a grain closure as described in claim 3, an upper elongated rectangular-shaped sheet having flaps extended from fold lines spaced from the ends of the sheet, and vertically spaced horizontally disposed bands mounted on a side of said sheet and positioned with the ends of the bands extended beyond the fold lines between the ends of the sheet and flaps, and the ends of said bands of the upper sheet also having spaced openings therein, said upper sheet being positioned with the lower edge overlapping the upper edge of the sheet with the flange on the lower edge with the parts in operative positions to form a closure.

6. In combination with a grain door closure as described in claim 3, a frame having vertically disposed side members and upper and lower horizontally disposed members positioned against said sheet and secured in position by fastening elements extended through the sheet and adapted to extend into parts of a box car at the sides of a door opening over which the closure is positioned.

BARTON H. FORD.
EDWIN J. FORD.
MICHAEL J. FORD.

REFERENCES CITED

The following references are of record in the file of this patent:

UNITED STATES PATENTS

| Number | Name | Date |
|---|---|---|
| 1,895,625 | Hummel | Jan. 31, 1933 |
| 2,116,260 | Corkran | May 3, 1938 |
| 2,483,523 | Brandon | Oct. 4, 1949 |